A. A. FOSSTON.
PISTON RING.
APPLICATION FILED MAY 6, 1914.
1,147,228.
Patented July 20, 1915.
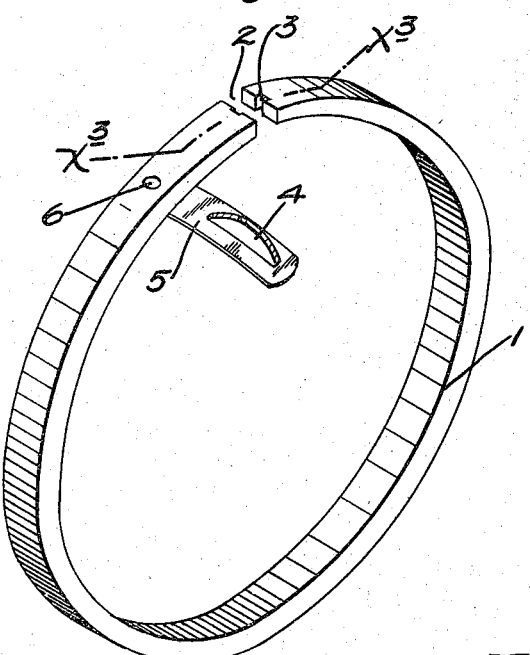
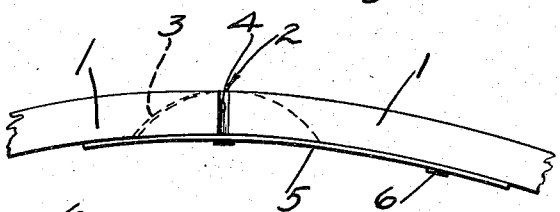
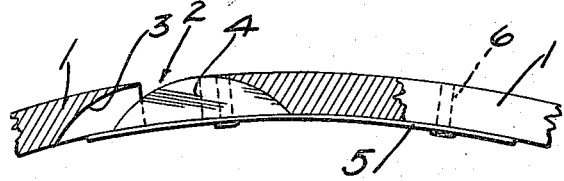
WITNESSES
E. C. Skinkle
A. H. Opsahl.
INVENTOR
Axel A. Fosston
BY HIS ATTORNEYS
Williamson Merchant

UNITED STATES PATENT OFFICE.

AXEL A. FOSSTON, OF MINNEAPOLIS, MINNESOTA.

PISTON-RING.

1,147,228.

Specification of Letters Patent.

Patented July 20, 1915.

Application filed May 6, 1914. Serial No. 836,673.

*To all whom it may concern:*

Be it known that I, AXEL A. FOSSTON, a citizen of the United States, residing at Minneapolis, in the county of Hennepin and State of Minnesota, have invented certain new and useful Improvements in Piston-Rings; and I do hereby declare the following to be a full, clear, and exact description of the invention, such as will enable others skilled in the art to which it appertains to make and use the same.

My invention has for its object to provide an improved piston ring for engine cylinders; and, to such ends, generally stated, the invention consists of the novel construction and arrangement of parts hereinafter described and defined in the claims.

The invention is illustrated in the accompanying drawings, wherein like characters indicate like parts throughout the several views.

Referring to the drawings, Figure 1 is a perspective view, showing the improved piston ring; Fig. 2 is a side elevation of a portion of the piston ring shown in Fig. 1; and Fig 3 is a section taken approximately on the line $x^3$ $x^3$ of Fig. 1.

The piston ring 1, like most piston rings, is cut through at 2, so as to make the said ring expansible and contractible under its own spring tension. This piston ring, like ordinary piston rings, is also turned with a normal diameter slightly greater than the cylinder into which it is to be sprung when applied to the piston, so that it will thereby maintain close contact with the cylinder and compensate for wear. In accordance with my invention, the abutting ends of the piston ring are formed with notches or blade seats 3, which are preferably about one-third the width of the ring, and are simultaneously formed by a milling tool which cuts the said seats with parallel sides and with segmental or curved inner end walls.

The seats 3 receive and closely fit a flat segmental joint plate 4, the curved edge of which is preferably made to closely fit the curved inner end walls of the said seats. The said curved inner end walls of the seats 3 flare inwardly and cut but very slightly through the outer surface or periphery of the piston ring.

The joint plate 4 is secured to one end of a thin flat leaf spring 5, the other end of which is attached to the inner surface of one end portion of the piston ring, preferably by a single rivet 6 that affords a pivot permitting the said spring and joint plate to be turned laterally into an inoperative position shown in Fig. 1, when the said plate is sprung inward out of engagement with the seats 3. This permits the seats 3 and plate 4 to be readily cleaned of carbon or other collected dirt.

The depth of the joint plate 4 is such that the spring 5 will be held pressed away from the abutting ends of the piston ring, when the piston ring is inserted in a cylinder, and the edge of said plate 4 is then pressed against the surface of the cylinder by the said spring. A tight joint is thus maintained between the ends of the piston ring and the cylinder and plate 4. As the piston ring wears away, the ends thereof will separate slightly and the joint plate 4 will be moved outward by the spring 5, so that it will maintain its engagement with the cylinder.

The piston ring described, while of simple construction, has in practice been found efficient for the purposes had in view.

What I claim is:—

1. A piston ring split at one point and provided at its abutting ends with inwardly diverging seats that terminate close to the ends of the outer cylindrical surfaces of said split ring, and a leaf spring attached at one end to one of the end portions of said ring, and provided with a joint plate having inwardly diverging edge surfaces closely fitting the inwardly diverging seats in the ends of said ring and yieldingly pressed outward by said spring.

2. A piston ring split at one point and provided at its abutting ends with inwardly diverging seats that terminate close to the outer cylindrical surfaces of the ends of said split ring, and a leaf spring attached at one end to one end portion of said ring and provided with a joint plate having inwardly diverging edge surfaces closely fitting the seats in the ends of said ring and yieldingly pressed outward by said spring, the said spring being capable of pivotal movement, so as to turn the said joint plate into an inoperative position at one side of said ring.

In testimony whereof I affix my signature in presence of two witnesses.

AXEL A. FOSSTON.

Witnesses:
F. D. MERCHANT,
HARRY D. KILGORE.

Copies of this patent may be obtained for five cents each, by addressing the "Commissioner of Patents, Washington, D. C."